United States Patent
Khan

(10) Patent No.: US 7,029,282 B2
(45) Date of Patent: Apr. 18, 2006

(54) E.I.Q. TESTS (EMOTIONAL INTELLIGENCE QUOTIENT TESTS)

(76) Inventor: Sajid Ali M. Khan, 2 Union Pl., Ridgefield Park, NJ (US) 07660

( * ) Notice: Subject to any disclaimer, the term of this patent is extended or adjusted under 35 U.S.C. 154(b) by 0 days.

(21) Appl. No.: 10/370,402

(22) Filed: Feb. 19, 2003

(65) Prior Publication Data

US 2004/0161733 A1 Aug. 19, 2004

(51) Int. Cl.
*G09B 19/00* (2006.01)

(52) U.S. Cl. ...................... 434/236; 434/236
(58) Field of Classification Search ................ 434/236, 434/118, 322, 350
See application file for complete search history.

(56) References Cited

U.S. PATENT DOCUMENTS

| | | | | |
|---|---|---|---|---|
| 4,931,934 | A * | 6/1990 | Snyder | 434/236 |
| 6,375,470 | B1 * | 4/2002 | Rohan | 434/236 |
| 6,418,435 | B1 * | 7/2002 | Chase | 707/5 |
| 6,497,577 | B1 * | 12/2002 | Kanter | 434/236 |
| 6,651,071 | B1 * | 11/2003 | O'Brien et al. | 707/102 |
| 2003/0108849 | A1 * | 6/2003 | Hodges | 434/236 |

* cited by examiner

*Primary Examiner*—Monica S. Carter
*Assistant Examiner*—Cameron Saadat

(57) ABSTRACT

It is an object of the present invention to provide a method of evaluating emotional intelligence through emotional intelligence quotient testing. There are four levels of the emotional mind and each level is assigned a grade. A series of questions are asked on specific emotions, and answers are graded according to the mental level these answers are coming from. This test enables an individual to learn where he or she stands with respect to each specific emotion.

1 Claim, No Drawings

E.I.Q. TESTS (EMOTIONAL INTELLIGENCE QUOTIENT TESTS)

BACKGROUND

Field of Invention

This invention relates to a method of testing emotional intelligence.

BACKGROUND OF THE INVENTION

There is a debate going on whether I.Q. tests have much value. In this applicant's humble opinion I.Q. tests are valuable. However, I.Q. tests are incomplete. I.Q. tests do not cover emotional intelligence, an equally essential cognitive ability which is the other half of human intelligence.

Education is of two forms. Formal education which comes mainly from the so called 3 Rs—reading, writing and arithmatic. Just as important is informal education that one gets mainly from ones upbringing. Formal education develops intelligence and informal education develops emotional intelligence. We have I.Q. tests to determine intelligence. There is no test for determining emotional intelligence. To overcome this gap, this applicant developed E.I.Q. tests (Emotional Intelligence Quotient Tests)

The human mind works in images. We grow up, creating images of ourselves, others and the world depending on our childhood experiencing creating our own personal reality by which we live. When our personal reality matches the actual reality out there we succeed. When our personal reality is different from the actual reality we fail. The correct perception of reality is the key ingredient that determines success or failure in life.

We can safely say that sound emotional intelligence is the correct perception of reality. An unsound emotional intelligence is a wrong perception of reality.

The human mind goes through four stages of development as follows:

a) Premature mind: this mind is womb-conditioned. (the conscious experiences of the fetus in the womb-environment). The personal reality for each and every human at these stage is womb-reality. The fetus at this stage feels omnipotent and omnipresent. Just before birth the human mind is womb-conditioned, shaped by the conscious experiences of womb-life.

A few hours of the birth process do not change the fetus' womb-conditioned mind and at birth the new born child feels omnipotent and omnipresent, just as it felt inside the womb for several months.

However, my concept of womb-conditioning is contravercial, so just ignore the above two paragraphs and lets start again the four stages of human mind development:

a) Premature mind—the mind at birth when each human being feels omnipotent and omnipresent. The personal reality at this level is that the new born child considers itself all powerful, considers itself all existence as it is not aware of any one else except itself. Self is all that matters. It understands nothing. Personal reality is that the self is omnipotent and omnipresent.

b) Immature mind—the mind of a child where the child considers itself between omnipotent and helpless. As the child grows older omnipotence is set aside, goes deeper and deeper into the unconcious, and feelings of helplessness give way to confidence and self-importance. The delicate transistion from feeling of omnipotence to realistic self-importance depend on the child's upbringing. Confusion gives way to clarity. At this stage of the mental level the personal reality is that self matters most.

c) Mature mind—the mind of an adult. At this stage the adult considers himself most important and others equally important. Learns the ropes of life. Helps self and family first. Helps others also.

d) Master mind—the mind of a guru or teacher. At this stage of the mind the person considers himself as part of the whole human family. Everyone else is number 1. This level of the mind strives to help others, especially the less fortunate.

OBJECTS AND ADVANTAGES

Several objects and advantages of the present invention are: there are four levels of personal reality. From premature to master mind. From totally unrealistic to super realistic. Not only can we measure the emotional intelligence of individuals, but also of groups, organizations, religion, even countries. Take the example of countries like India. I would place India at the immature level.

At this level the mind is confused between omnipotence and helplesness. At this stage the mind is an opportunist. When good people are in power and the laws of the land are enforcable the citizens are law abiding. When bad people are in power the citizens become corrupt. India is a land of opportunists, thus its emotional level is that of an immature mind.

The same formula can be applied to conflicts. Take the Israeli-Palestinian conflict. Both groups are apporching the conflict at the premature level. As if each exists alone. Imagine if they approached the conflict at the master mind level.

SUMMARY

In accordance with the present invention we can measure emotional intelligence through Emotional Intelligence Quotient Tests. As there are four levels of the mind. There are four levels of the emotional mind. Every human mind is stuck emotionally at one of the four levels. However the same person can be stuck at several levels. For example he may love one person at the master mind level and hate some group at the premature level. E.I.Q. test is designed to test the personal reality levels of the different emotional feelings of the individual, above all the feelings that each one has towards one's own self

DETAILED DESCRIPTION OF THE INVENTION

In accordance with the present invention, a system and method of evaluating the emotional intelligence of an individual through Emotional Intelligence Quotient Tests (E.I.Q.).

The E.I.Q. level which is the same as maturity level or Personal Reality level of each individual can be determined by posing a sequence of questions that answer and determine the emotional intelligence level of the individual.

This is done by taking each human emotion as well as every emotional memory and asking a list of questions. Each answer is tested against the correct answer. The answers are graded according to the four levels of the mind, (Emotional Intelligence)

a) Premature mind: −2 b) Immature mind: −1 c) Mature mind: +1
d) Master mind: +2

Each emotion is tested one at a time. Love and hate can be tested together (———).

a) How do you feel about yourself?
   1) I hate myself. The grade for this answer is: (−2).
   2) I have mixed feelings: (−1)
   3) I love myself: (+1)
   4) I am in awe with myself: (+2)

b) How do you feel about others?
   1) I hate them: (−2)
   2) I don't know: (−1)
   3) I love them enough: (+1)
   4) I love them as much as I love myself (+2)

c) Are you angry?
   1) Most of the time: (−2)
   2) Often: (−1)
   3) Rarely: (+1)
   4) Never: (+2)

d) Are you happy with yourself?
   1) Sometimes extremly happy, other times extremly unhappy: (−2)
   2) Confused about self: (−1)
   3) Mostly happy: (+1)
   4) Always Happy: (+2)

e) How would you grade your own importance?
   1) I am the only one that counts : (−2)
   2) I am most important: (−1)
   3) I am equally important: (+1)
   4) I am humble and everyone else is number one for me: (+2)

Similarly all human emotions and behavior will be graded. Handing out the grades to each individual will also include instructions on how to improve ones emotional intelligence as E.I.Q. can be significantly improved by closing the gap between personal reality (PR) and actual reality (AR).

The human mind grows up absorbing experiences which in turn create images of ourselves, others and the way the world works. These experiences create a personal reality by which we interpret life. If our upbringing is healthy we grow up with a personal reality (PR) that is close to the actual reality (AR) out there. If our upbringing is unhealthy we grow up with our PR different from AR.

When PR=AR the chances for success are maximum. The aim of emotional intelligence education has to be to make our personal reality as close as possible to the actual reality. AR can be the benchmark of emotional intelligence.

What is claimed is:

1. A method of evaluating emotional intelligence through emotional intelligence quotient testing, comprising the steps of:

posing a series of questions designed to reveal the emotional intelligence level of an individual;

obtaining an answer for each question from the individual;

grading the answer for each question according to four levels of emotional intelligence, wherein the four levels of emotional intelligence consist of the grades: premature mind, immature mind, mature mind, and master mind;

wherein premature mind is associated with a value of negative two; immature mind is associated with a value of negative one; mature mind is associated with a value of positive one; master mind is associated with a value of positive two;

wherein the premature mind is defined as a mindset of an individual being omnipotent and omnipresent; wherein the immature mind is defined as a mindset of an individual being between omnipotent and helpless; wherein the mature mind is defined as a mindset wherein an individual considers himself or herself most important and others equally important; wherein the master mind is defined as a mindset of an individual being altruistic;

presenting the grades to the individual with instructions indicating how to improve emotional intelligence.

* * * * *